(12) United States Patent
Reeves et al.

(10) Patent No.: US 11,384,922 B2
(45) Date of Patent: Jul. 12, 2022

(54) CLIP HOLDER FOR OUTDOOR LIGHTS

(71) Applicant: 4 Guys Holdings LLC, Medina, OH (US)

(72) Inventors: Grant Reeves, Medina, OH (US); Kevin Provagna, Medina, OH (US); James Gensert, Litchfield, OH (US); Scott Buetow, Lake in the Hills, IL (US); Ryan Westlake, Joliet, IL (US)

(73) Assignee: ELD Holdings, LLC, Medina, OH (US)

( * ) Notice: Subject to any disclaimer, the term of this patent is extended or adjusted under 35 U.S.C. 154(b) by 376 days.

(21) Appl. No.: 16/234,131

(22) Filed: Dec. 27, 2018

(65) Prior Publication Data

US 2020/0208813 A1    Jul. 2, 2020

(51) Int. Cl.
| F21V 21/08 | (2006.01) |
| F16M 13/02 | (2006.01) |
| F16B 2/24 | (2006.01) |
| F21V 21/088 | (2006.01) |
| F21W 121/00 | (2006.01) |
| F21W 131/10 | (2006.01) |

(52) U.S. Cl.
CPC .............. F21V 21/088 (2013.01); F16B 2/24 (2013.01); F16M 13/022 (2013.01); *F21W 2121/004* (2013.01); *F21W 2131/10* (2013.01)

(58) Field of Classification Search
CPC .......... F21V 21/088; F16B 2/24; F16B 2/248; F16M 13/022; F21W 2121/004; F21W 2131/10; F16G 11/101; F21S 4/10
See application file for complete search history.

(56) References Cited

U.S. PATENT DOCUMENTS

| 2,929,121 | A | * | 3/1960 | Tinnerman | ................. | E04G 7/28 |
| | | | | | | 256/48 |
| 3,675,275 | A | * | 7/1972 | Arblaster | ................ | A44B 99/00 |
| | | | | | | 248/75 |
| 3,883,934 | A | * | 5/1975 | Rochfort | .................. | F16B 2/248 |
| | | | | | | 248/302 |
| 4,417,635 | A | * | 11/1983 | Thepault | ................. | B60K 11/04 |
| | | | | | | 24/458 |
| 4,893,788 | A | * | 1/1990 | Chave | ..................... | E04H 17/10 |
| | | | | | | 403/397 |
| 5,004,211 | A | * | 4/1991 | Rayner | .................... | E04H 17/10 |
| | | | | | | 256/48 |
| 5,664,768 | A | * | 9/1997 | Scabar | ..................... | E04H 17/10 |
| | | | | | | 256/48 |
| 6,254,049 | B1 | * | 7/2001 | Goehly | ................... | A01G 17/08 |
| | | | | | | 248/302 |

(Continued)

*Primary Examiner* — David M Upchurch
(74) *Attorney, Agent, or Firm* — Daniel Basov, Esq.; Michael Pesochinsky, Esq.

(57) ABSTRACT

A round or rectangular clip assembly that utilizes torsion tension spring loops, formed from the flexible material. The clip forms a tongue segment on one side of the torsion tension spring loops, and multiple extension members on the second side.
The spring loop is configured to pushes the tongue segment toward the substantially parallel surface formed on each extension member, and can hold a light bulb or a light socket inbetween. The clip also includes additional torsion three-quarter rounded tension spring loop, which can be rounded for holding a wire or an extension cord, or rectangular, for attaching to a rectangular fixture.

18 Claims, 10 Drawing Sheets

(56) References Cited

U.S. PATENT DOCUMENTS

| | | | | |
|---|---|---|---|---|
| 7,051,414 B2* | 5/2006 | Swanson | ............... | A44C 27/00 |
| | | | | 24/549 |
| 7,175,147 B1* | 2/2007 | Marks | .................. | B65D 55/16 |
| | | | | 248/302 |
| 8,109,475 B2* | 2/2012 | Kerchner | ............... | F16L 3/205 |
| | | | | 248/302 |
| 8,317,147 B1* | 11/2012 | Serrano | ................. | F21S 9/035 |
| | | | | 248/302 |
| 2006/0129168 A1* | 6/2006 | Shipp | ............... | A61B 17/1227 |
| | | | | 606/151 |
| 2017/0089373 A1* | 3/2017 | Schulte | ............... | F16B 7/0493 |

* cited by examiner

CLIP HOLDER FOR OUTDOOR LIGHTS

BACKGROUND

Field of the Invention

The present invention relates generally to fastening clips for light bulbs, lights and wiring for the outside displays or structures. More specifically, the present invention relates to lighting clips, tape and attachment structured used for attaching and fastening socket lights, light bulbs, wiring and other light assembly components in displays used in theme parks, shows, campsites and for public outdoors events.

While many different clamps and fixtures are commonly known and used for the attachment of lighting fixture indoors or in more permanent installations, in the outdoor or temporary settings (like in theme parks, shows, campsites and at outdoors events) the lights are typically fastened to various structures and wiring with a masking or other adhesive tape.

The user or the electrician typically responsible for the assembling of many outdoor lights typically places or fastens the cord and bulb with tape, more specifically electrical tape, also referred to in the art as tape method. Depending on the display configuration, the user may find that the specific tape method can sometimes obscure the portions of the display. Furthermore, the tape method is very time consuming, and often the user who is not a professional electrician may struggle fastening the cord, multiple light bulbs and attaching them quickly to the supporting structures. Furthermore, the installation needs may change, and removing and relocating the assembled and fastened lights takes a great deal of time when the regular tape method is utilized. As such, the accuracy of the fastening placement and the ease or moving or changing the installed components and lights varies, depending on the display configuration.

In addition, the tape method arranges each light socket or light bulb in a particular direction, which may be time consuming and complicated to change or vary quickly, when the lighting conditions change or in the case of weather changes. Also, the removal of multiple lighting component from the structures is often long and laborious when the tape method is utilized for attachment.

Moreover, in a cord and light bulb assembly, including but not limited to fastening of an electrical cord, a wire and a bulb, is often more critically important to arrange the bulb in a specific orientation or have the light fast in a particular direction. Also, it is also important that the masking or other tape used for assembly should not be is visible upon completion of the installation.

In many installations that use the taping/tape method, the placement of the tape may interfere with the display. The tape may also become loose or unraveled, and causes the electrical wires and/or light fixtures and sockets to fall off the display, which may present a safety issue in public setting. For outside settings, the changes in weather, the extreme weather (ex. strong and sudden gusts of wind, tropical rainstorms, snow or hail) or sudden and extreme temperature swings may cause the tape to lose the adhesion and the installation components to fall down or become loose.

SUMMARY OF THE INVENTION

The present invention addresses and resolves the above-mentioned shortcomings of the tape installation method for the light sockets, wiring and other components, particular for the outdoors events or in the settings where the assembled lights may be moved or removed quickly, or where there the weather conditions may change and affect the adhesion power of the tape used for assembly.

The present invention provides several variants of a wire and bulb tension clip, which can quickly and securely fasten the light bulb, light socket, wires and structural components to which the lighting assembly is attached. The claims may be made from a number of materials, including titanium, carbon, nickel alloys and copper alloys. The wire and bulb tension clips of the present invention may also be made of uethane and other plastic spring components, even though us of plastic materials will typically have lesser tensile force than the of the metal components for the wire and bulb tension clips of the present invention.

In addition, the wire and light bulb tension clips of the present invention are structured in a way that allows the bulbs and cords to be inserted and positioned in a specific orientation or direction. Also, the clips have a unique design configuration that allows the installer (or user) to attach the clip on a wire form display round stock or square tubing. This type of installation is very quick and efficient and allows the wires/bulbs to stay in the attached position while the other component are being fastened (or replaced).

It also eliminates or reduced the need for the use of tape in the installation. As a result the installation process is done much faster, and the disassembly or modifications to the assembled system and component is also much faster and more efficient.

The present invention utilizes a round stock clip or rectangular stock clip torsion spring construction in accordance with at least one embodiment of the present invention. It utilizes a torsion spring construction with two tension spring loops that form a tongue segment, with one or more inward sloping part. The mechanical force between the tongue part and the substantial parallel surfaces of two extension members holds a place item (ex. light bulb fixture) in place.

In addition, the round stock clip has another rounded torsion spring loop on each of the extension members, for holding the wire and/or extension cords. The rectangular (or square) stock clip utilizes a square torsion spring loop on each of the extension members, for attaching the clip (and any other items it may be holding) to a rectangular bar, railing or some fixture.

BRIEF DESCRIPTION OF THE DRAWINGS

The above and other features and aspects of the present invention will become more apparent upon reading the following detailed description in conjunction with the accompanying drawings, which provide.

DETAILED DESCRIPTION

The construction and operation of the invention is explained with reference to at least one embodiment shown in FIGS. 1-8. While some embodiments described herein and depicted in corresponding figures show use of a particular dimensions and shape, or use of a particular materials for the clip, the present invention is not limited to any particular material, shape or specific dimensions, unless such features are expressly stated in the following claims.

A person skilled in the art would understand and apply the structural design of the present invention to many different types and shapes of clips, and use different types of materials for the construction, in accordance with the invention and based on the desired tension strength and the intended application. Moreover, the invention is not limited to any particular type manufacturing process and may utilize and be produced in accordance with at least one embodiment the present invention. In addition, a person skilled in the art may apply the structure and organization of the described components to other types of clips and other purposes of use.

FIGS. 1A-E illustrate the components and structure of a round stock clip 110 constructed in accordance with at least one embodiment of the present invention. The clip 110 utilizes a torsion spring construction by having two tension spring loops 120A and 120B. The torsion spring works by torsion or twisting of a flexible elastic object, and stores mechanical energy when it is twisted. It exerts a torque (force) in the opposite direction, in proportion to the amount and angle of the twisted loop.

The metal, plastic or another flexible material utilized in accordance with the present invention is subjected to twisting into spring loops 120A and 120B, which form a connected tongue segment 130 on one end, with at least one inward sloping part 134. On the other side of the formed spring loops, the wire or some other flexible material utilized in accordance with the invention forms two extension members 140A and 140B.

The part 142 of each of the extension members 140A and 140B is substantially parallel with the direction of the part 132 of the tongue segment 130. By utilizing a torsion spring mechanism the clip stores a mechanical energy, which pushes the tongue segment 130 and the parallel surface 142 of the extension members 140A and 140B toward each other. The enclosure area between these surface can be used to clasp and hold a light fixture or any other item in place.

Figure 7:
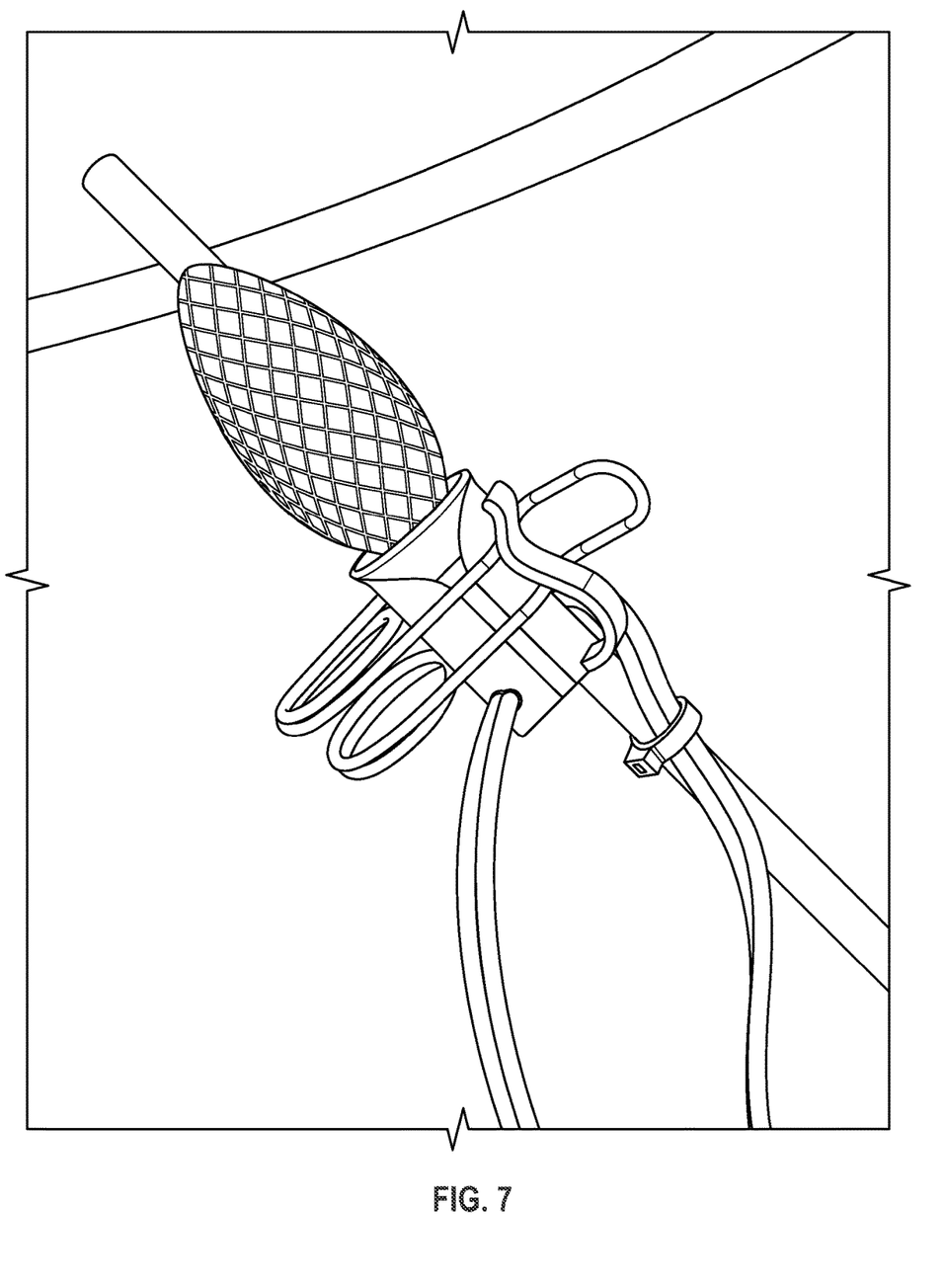
FIG. 7 is a photograph showing the use of a stock clip in accordance with at least one embodiment of the present invention for the assembly of lighting components and holding at least one light socket and wiring.
Figure 8:
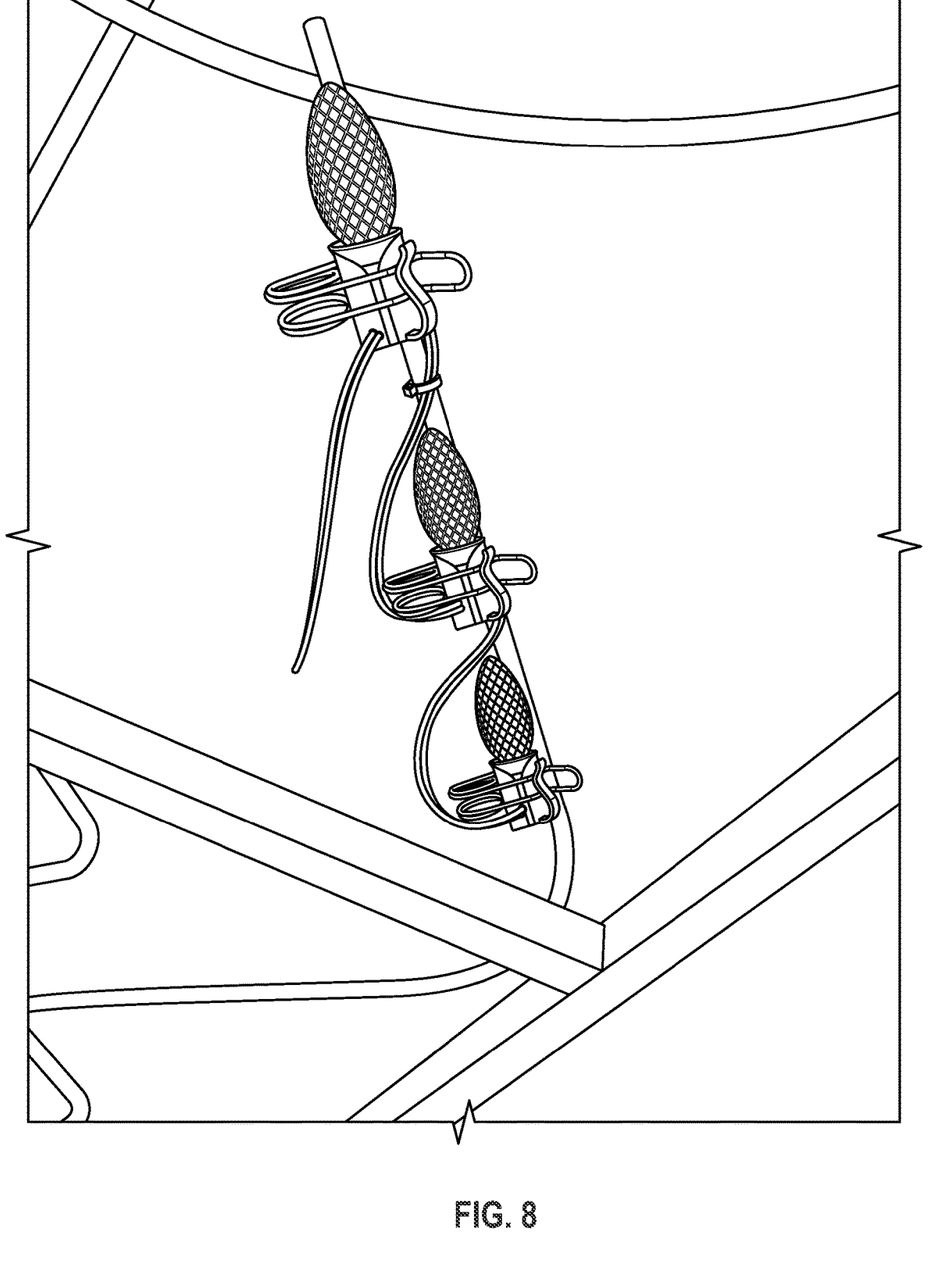
FIG. 8 is a photograph showing the use of multiple stock clips in accordance with at least one embodiment of the present invention for the assembly of multiple lighting components and holding multiple socket lights and wiring.

FIG. 7 is a photograph showing the use of a stock clip in accordance with at least one embodiment of the present invention for the assembly of lighting components. As shown in FIG. 7 a light socket and a light are held and attached to the wire by the tension in the enclosure area between the surface 142 and 132 of the clasp shown in FIGS. 1A-D. FIG. 8 is another photograph showing the use of multiple stock clips in accordance with at least one embodiment of the present invention for the holding multiple light fixtures and wiring by multiple clasps.

Each extension member 140A and 140B forms a loop section 145 and terminates with an outward extending part 148. The formed loop section on each of the extension members 140A and 140B also operates as a torsion spring, and pushes together the parts 142 and 144 of each of the extension members 140A and 140B. The loop area and the stored mechanical energy allows to clasp a wire or some thin generally cylindrical object, as for example electrical wires or power cord, in the loop section of each of the extension members 140A and 140B.

Figure 1A:
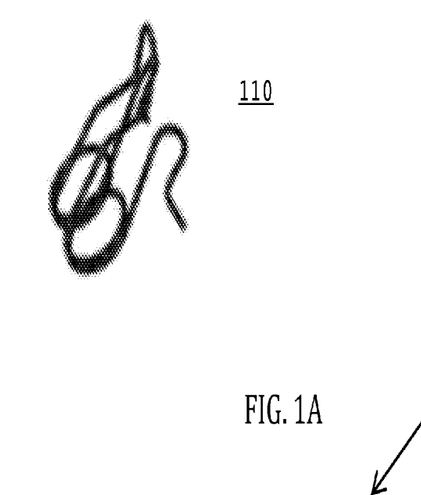
FIGS. 1A-E illustrate the structure of a round stock clip constructed in accordance with at least one embodiment of the present invention.
Figure 1B:
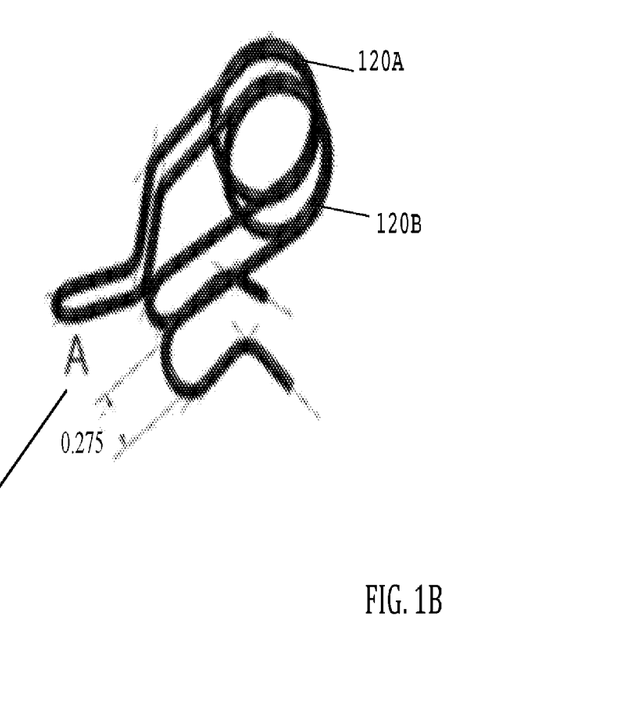
Figure 1C:
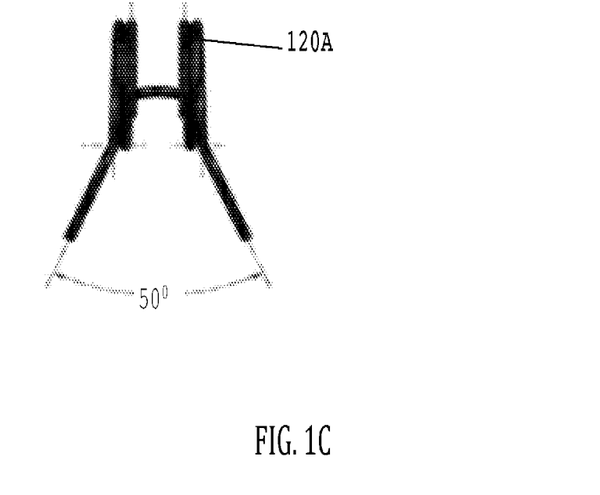
Figure 1D:
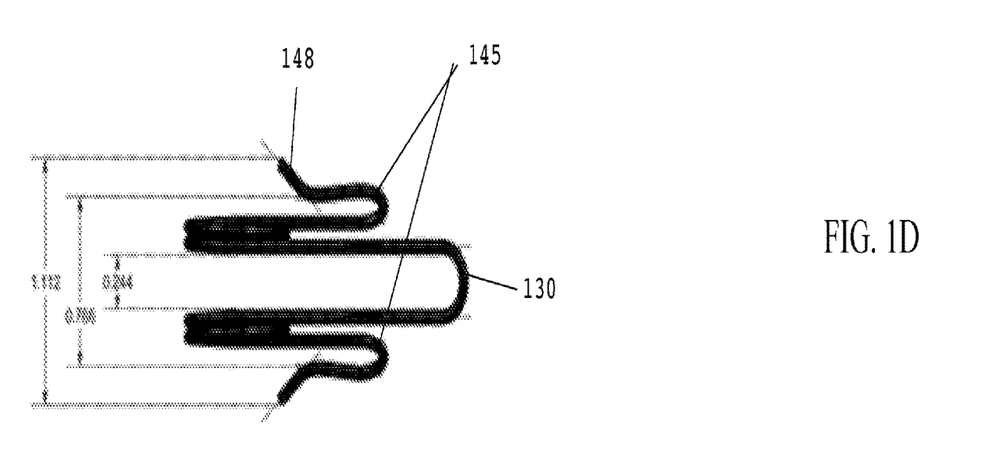
Figure 1E:
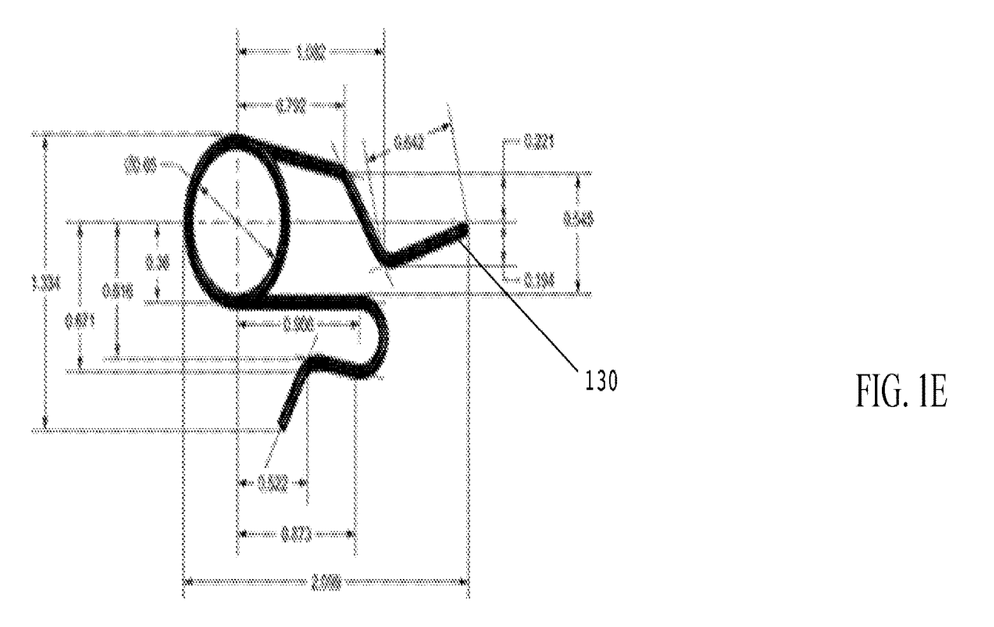
Figure 2A:
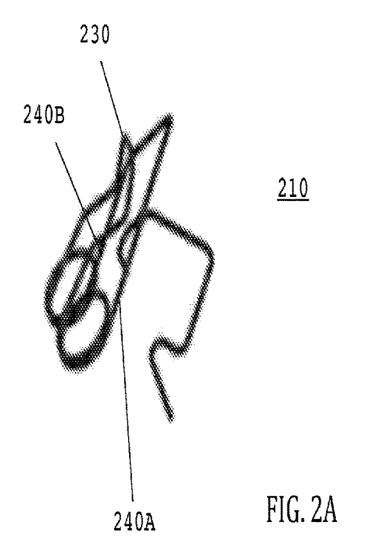
FIG. 2A-E illustrate the structure of a square stock clip constructed in accordance with at least one embodiment of the present invention.
Figure 2B:
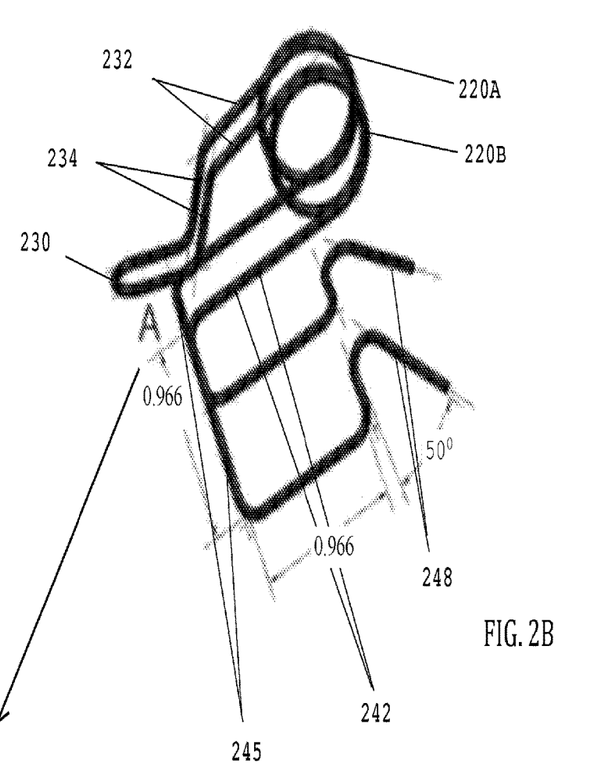
Figure 2C:
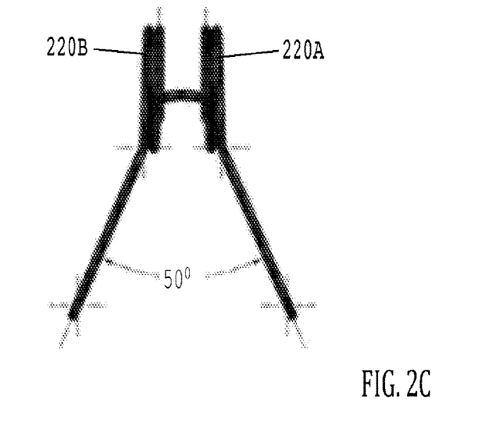
Figure 2D:
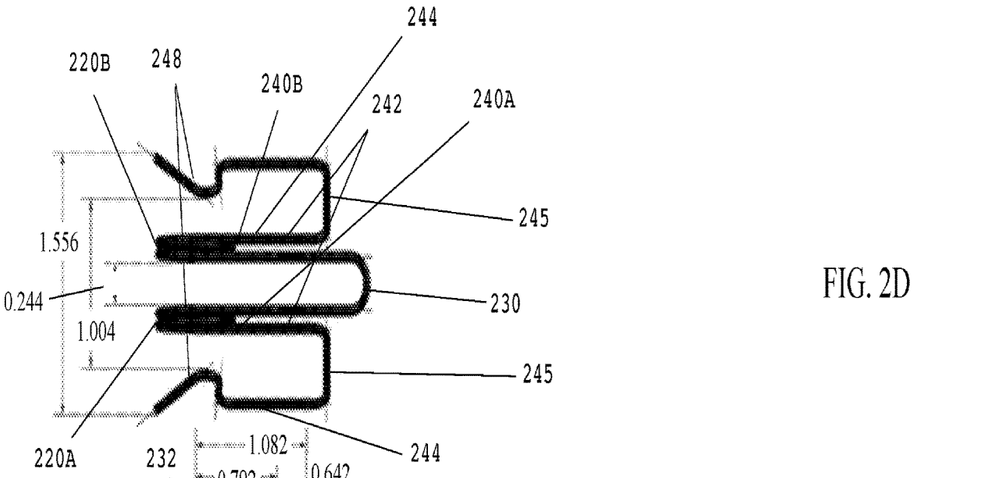
Figure 2E:
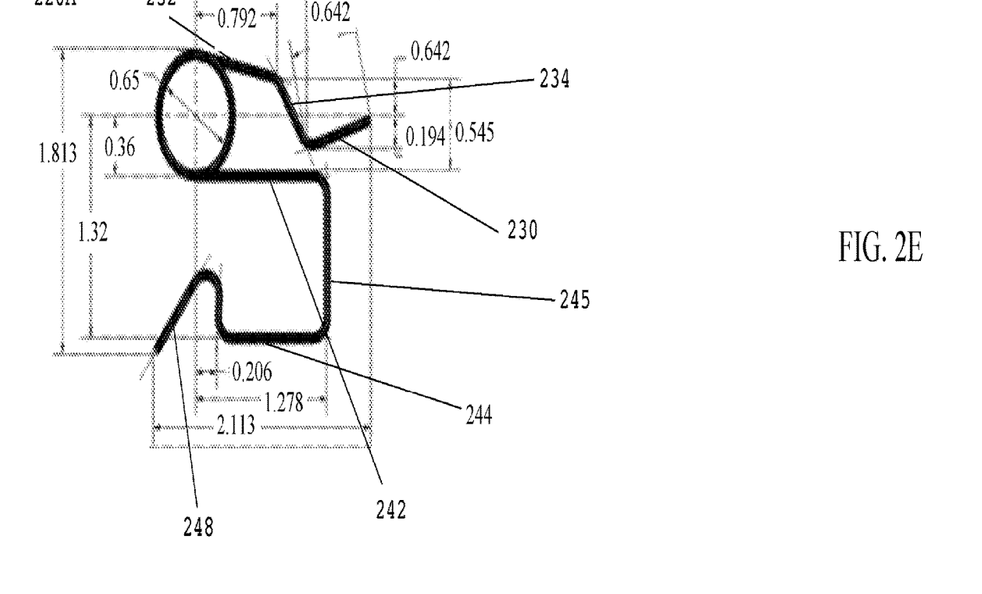
Figure 3:
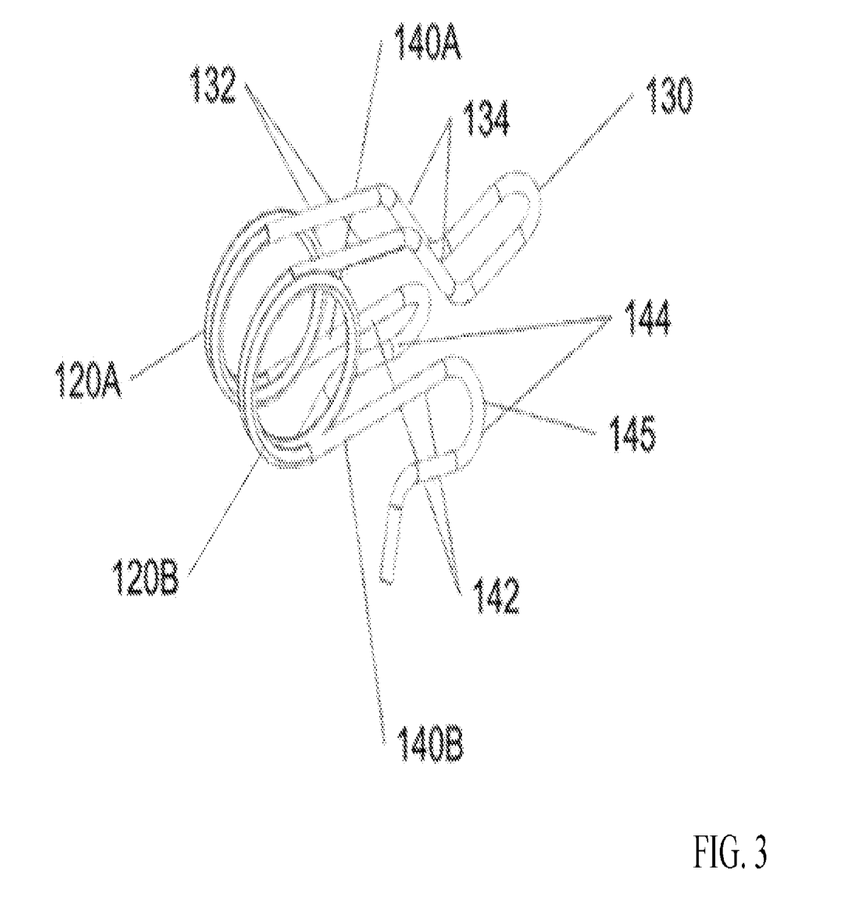
FIGS. 3 and 4 illustrates the structure and components of a round stock clip constructed in accordance with at least one embodiment of the present invention.
Figure 4:
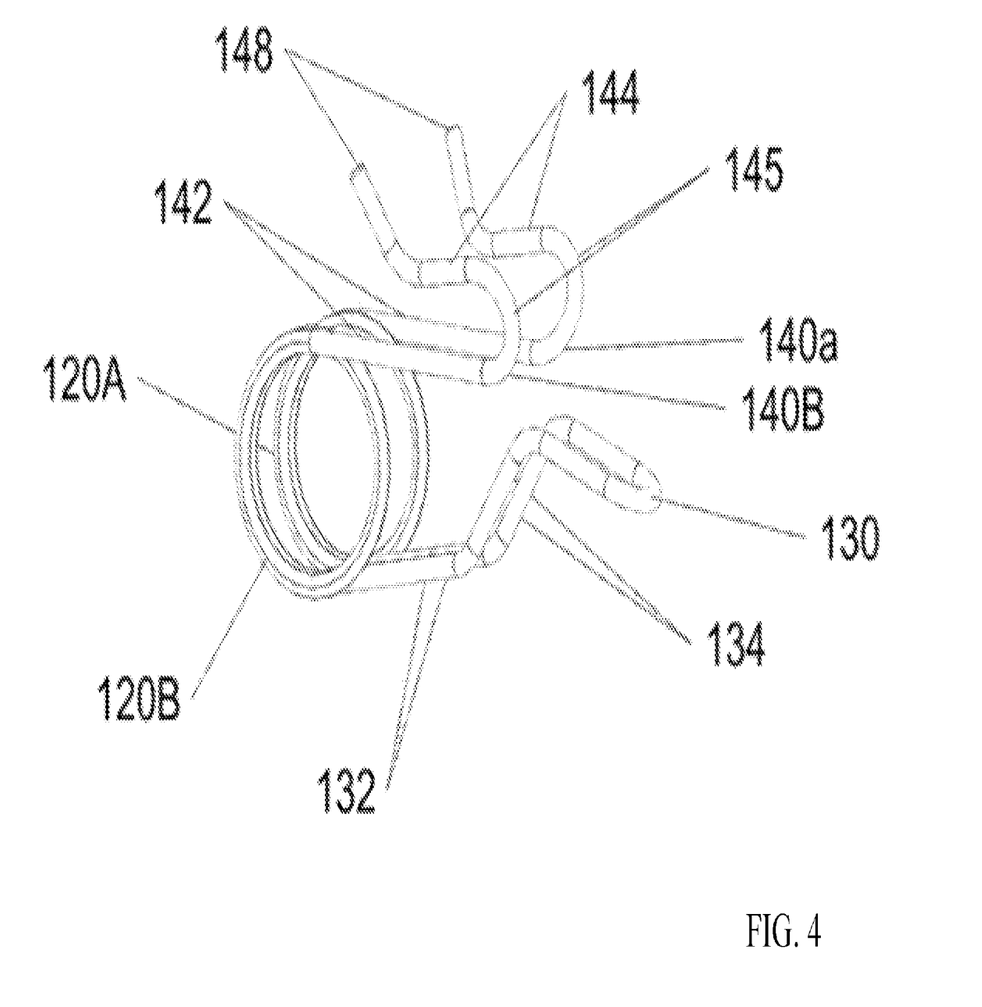

FIGS. 3 and 4 further illustrates the structure and components of a round stock clip with a three quarter rounded loop section 145 on each of the extension members 140A and 140B. The diameter of the loop sections 120A and 120B is one factor that will determine the torque and force with which the tongue segment 130 and the parallel surface 142 of the extension members 140A and 140B will push toward each other and thereby clasp any item placed inbetween those parts. The inward sloping surface 134 assures that the clasped item would not slip off in the longitudinal direction. The curvature of the rounded loop section 145 will be one factor that determines the torque or force between parts 142 and 144 of each of the extension members 140A and 140B, where a wire or an extension cord can be clipped during the installation.

FIG. 2A-E illustrate the structure of a square stock clip constructed in accordance with at least one embodiment of the present invention. A square clip 210 utilizes a torsion spring construction by having two tension spring loops 220A and 220B, similar to the tension spring loops 110A and 110B in FIG. 1A-E. The torsion spring works by torsion or twisting of a flexible elastic object, and stores mechanical energy when it is twisted. It exerts a torque (force) in the opposite direction, in proportion to the amount and angle of the twisted loop.

The metal, plastic or another flexible material is subjected to twisting into spring loops 220A and 220B, and forms a connected tongue segment 230 on one end, with an inward sloping part 234. On the other side of the formed spring loops, the wire or some other flexible material forms two extension members 240A and 240B. The part 242 of each of the extension members 240A and 240B is substantially parallel with the direction of the part 232 of the tongue segment 230.

By utilizing a torsion spring mechanism the clip stores mechanical energy, which pushes the tongue segment 230 and the parallel surface 242 of the extension members 240A and 240B toward each other. The enclosure area between these surface can be used to clasp and hold a light fixture or any other item in place. The use of the clip, showing that it hold a lighting fixture is shown in FIGS. 7 and 8 (the latter showing multiple clips, each holding a light fixture and wiring or extension cord).

Each extension member 240A and 240B forms a square (or rectangular) three quarter loop section 245 and terminates with an outward extending part 148. The formed square loop section on each of the extension members 240A and 240B also operates as a torsion spring, and pushes together the parts 242 and 244 of each of the extension members 240A and 240B. The loop area and the stored mechanical energy allows to clasp a wire or attach to a rectangular or square surface, such as railing, fixture, hook or some other object that is generally rectangular in shape and can support a lighting fixture and/or wiring, extending through the rectangular loop section formed between the surface 244 and 242 of each extension member 240A and 240B.

Figure 5:
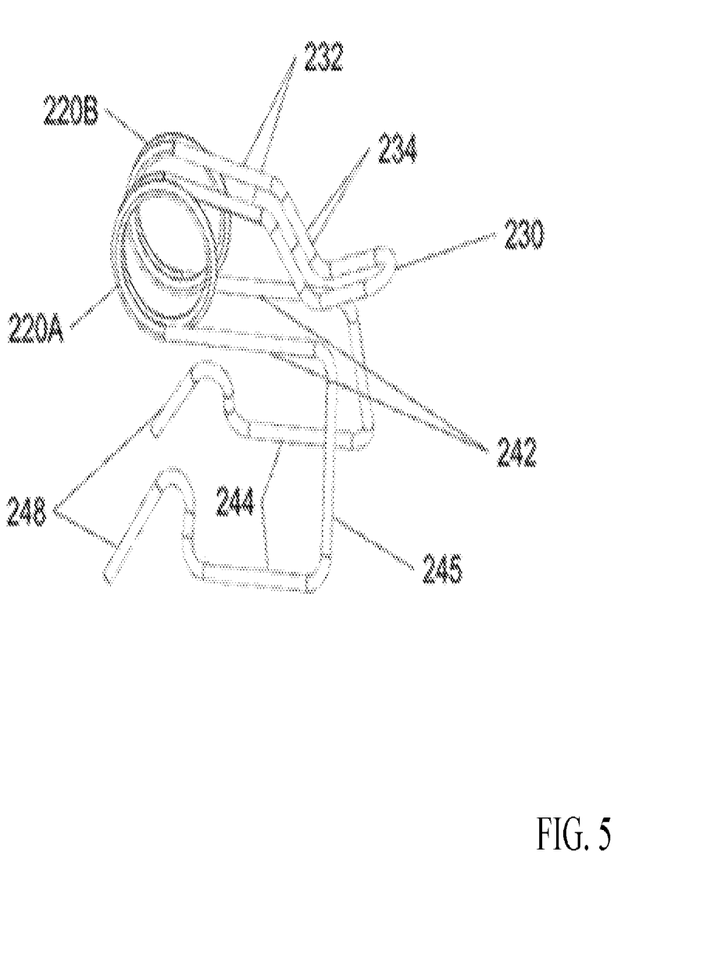
FIG. 5 illustrates the structure and components of a square stock clip constructed in accordance with at least one embodiment of the present invention.

FIG. 5 also illustrates the structure and components of a rectangular or square stock clip with a three quarter rectangular loop section 245 on each of the extension members 240A and 240B. Similarly, the diameter of the loop sections 220A and 220B is one factor that will determine the torque and force with which the tongue segment 230 and the parallel surface 242 of the extension members 240A and 240B will push toward each other and thereby clasp any rectangular shape item placed inbetween those parts. The inward sloping surface 234 assures that the clasped item would not slip off in the longitudinal direction. The curvature of the rectangular loop section 245 will be one factor that determines the torque or force between parts 242 and 244 of each of the extension members 240A and 240B, which is where the clip may attach to a rectangular railing or some fixture.

Figure 6:
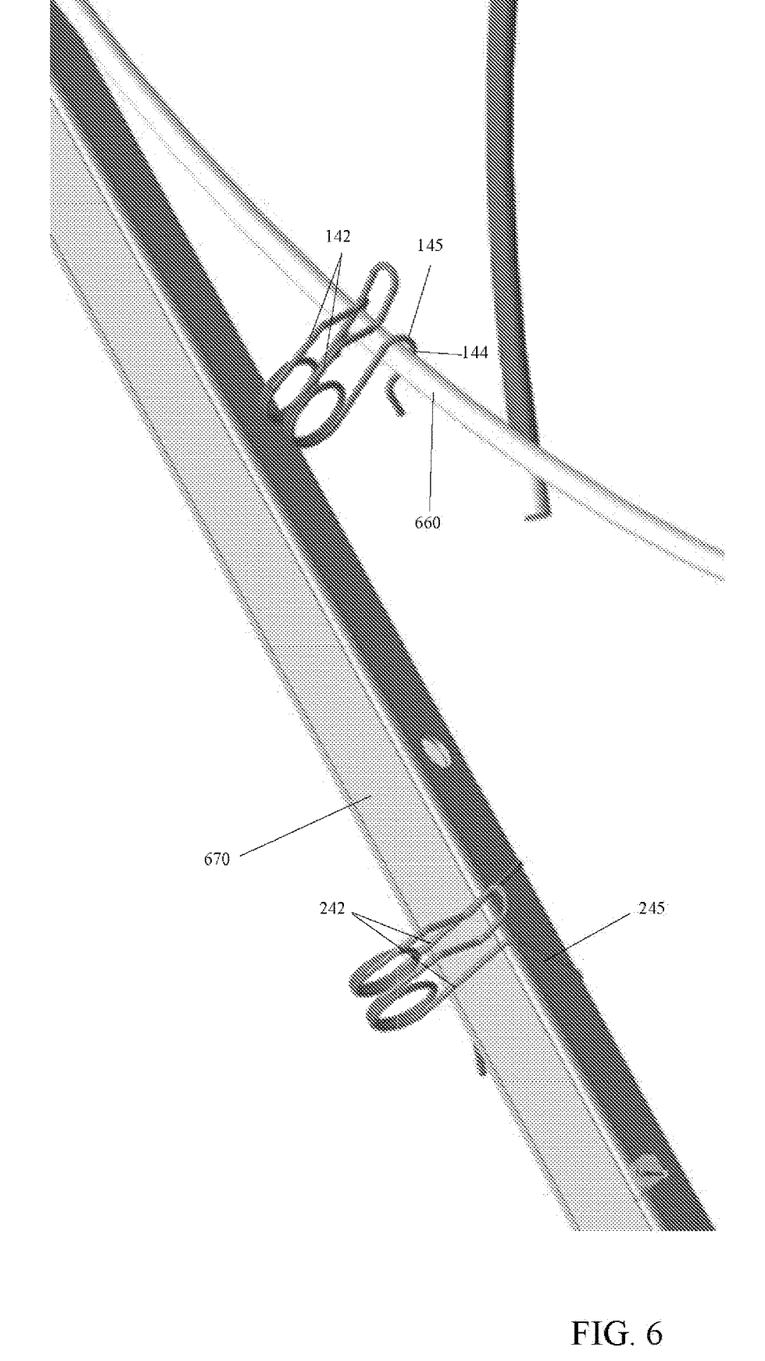
FIG. 6 illustrates an assembly utilizing a round stock clip and a square stock clip in accordance with at least one embodiment of the present invention for the assembly of lighting components.

FIG. 6 illustrates an assembly utilizing a round stock clip and a square stock clip in accordance with at least one embodiment of the present invention for the assembly of lighting components. In particular, as shown in FIG. 6, a round stock clip is attached and holds a wiring or extension cord 660 inserted through the circular loop section 145, and held by the torsion spring tension between the parts 142 and 144, forming the circular loop section 145 of each of the extension members of a round stock clip.

FIG. 6 also illustrates attachment and retention of a square stock clip, attached to a rectangular railing 670, and held by the rectangular loop section 245 and the torsion spring tension between the parts 242 and 244 (not show in FIG. 6), forming the rectangular loop section 245 of each of the extension members of a square stock clip.

The measurements and proportions of the components of the round and square stock clips in accordance with at least one embodiment of the present invention are provided for informational purposes only, and do not limit the actual invention to any particular size or proportion between elements and components. Other, different types of flexible materials may also be used in accordance with at least one embodiment of the present invention.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

We hereby claim:

1. A clip assembly comprising:
   a plurality of torsion tension spring loops formed by at least one flexible object that stores mechanical energy;
   a tongue segment formed on one side of each of the plurality of spring loops;
   one or more extension members formed on a second side of each of the plurality of spring loops;
   at least one additional torsion three-quarter tension spring loop formed by each of the extension members;
   wherein each of the plurality of spring loops pushes the tongue segment on one side of that spring loop closer to a substantially parallel surface formed on each extension member on the second side of that spring loop.

2. The clip assembly of claim 1, wherein the tongue segment comprises at least one segment that is directed inward toward the one or more extension members formed on the second side of each of the plurality of spring loops.

3. The clip assembly of claim 1, wherein the clip assembly is at least partially made of a metallic flexible material.

4. The clip assembly of claim 1, wherein the clip assembly is at least partially made of a plastic flexible and elastic material.

5. The clip assembly of claim 3, wherein the clip assembly is at least partially made of flexible wire.

6. The clip assembly of claim 1, wherein the clip assembly is configured to hold in place a light bulb or light socket for an outside light in a space between the tongue segment on one side of each of the plurality of spring loops and the substantially parallel surface of the extension members on the second side of each of the plurality of spring loops.

7. The clip assembly of claim 1, wherein the clip assembly is configured to attach to or hold in place at least one generally rounded fixture.

8. The clip assembly of claim 1, configured to operate outside, in all weather conditions.

9. A method of attaching a clip assembly comprising:
   providing a plurality of torsion tension spring loops formed by at least one flexible object that stores mechanical energy;
   providing a tongue segment formed on one side of each of the plurality of spring loops;
   providing one or more extension members formed on a second side of each of the plurality of spring loops;
   providing at least one additional torsion three-quarter tension spring loop formed by each of the extension members;
   utilizing a flexible and elastic material for each of the plurality of spring loops in a way that the tongue segment on one side of that spring loop pushes toward a substantially parallel surface formed on each extension member on the second side of that spring loop.

10. The method of claim 9, wherein the additional torsion three-quarter tension spring loop formed by each of the extension members is generally rounded in shape and attaches to or holds at least one rounded fixture.

11. The method of claim 9, wherein the additional torsion three-quarter tension spring loop formed by each of the extension members is generally rectangular in shape and attaches to or holds at least one rectangular fixture.

12. The method of claim 9, further including the step of:
   holding in place a light bulb or light socket for an outside light in a space formed between the tongue segment on one side of each of the spring loops and the substantially parallel surface of the extension members on the second side of that spring loop.

13. The method of claim 10, wherein the at least one additional torsion three-quarter tension spring loop, formed by each of the extension members, attaches to or holds at least one wire or extension cord.

14. The method of claim 11, wherein the at least one additional torsion three-quarter tension spring loop, formed by each of the extension members, attaches to or holds at least one rectangular railing.

15. The method of claim 9, further comprising attaching and using the clip assembly outdoors, in all-weather environment.

16. The clip assembly of claim 1, wherein the clip assembly further comprises at least one generally rounded fixture, and the assembly is configured to attach to or hold in place the said generally rounded fixture in a generally rounded space formed on the extension members.

17. The clip assembly of claim 1, wherein the clip assembly further comprises at least one generally rectangular rounded rectangular fixture, and the assembly is configured to attach to or hold in place the said generally rounded fixture in a generally rectangular space formed on the extension members.

18. The clip assembly of claim 17, wherein the generally rectangular fixture comprises a rectangular railing.

* * * * *